Figure 2:
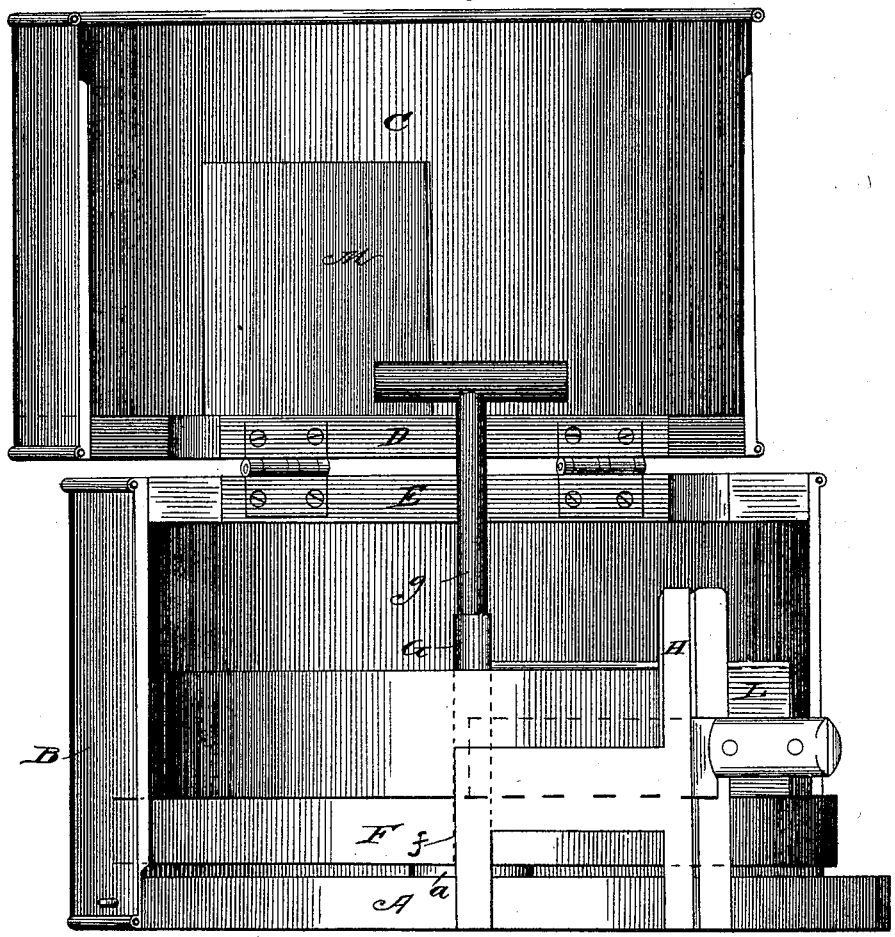

(No Model.) 2 Sheets—Sheet 1.
J. WALLACE.
CHEESE CUTTER.
No. 465,901. Patented Dec. 29, 1891.
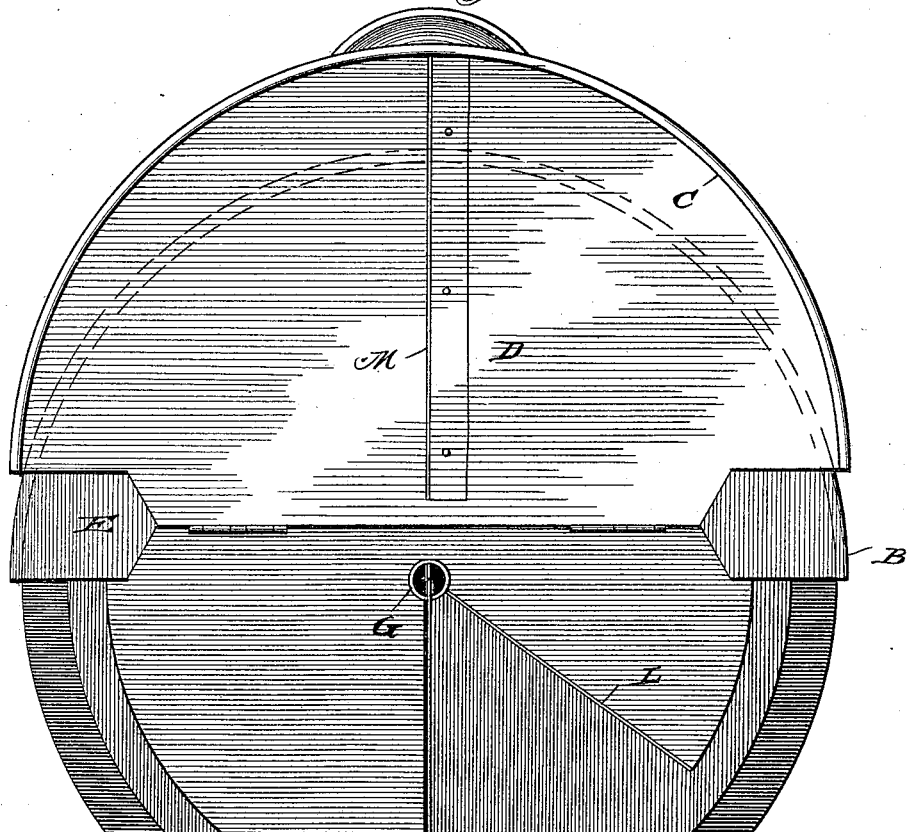
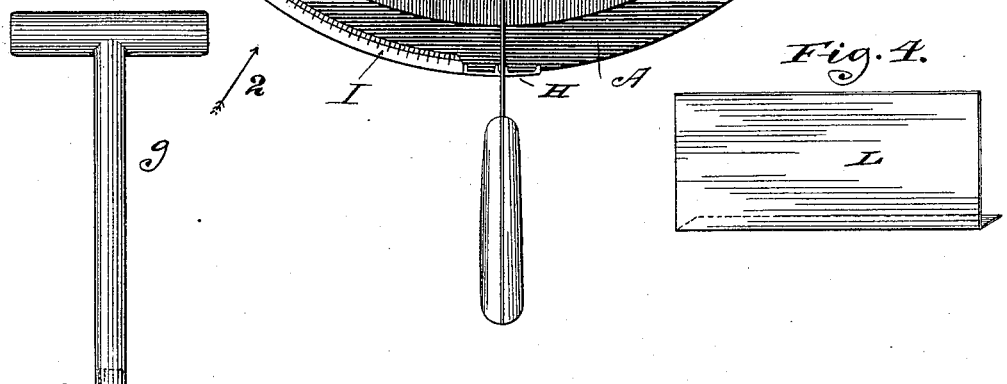
Witnesses,
J. T. Mann,
Frederick J. Goodwin
Inventor,
John Wallace
By Offield, Towle & Linthicum
Attys.

(No Model.) 2 Sheets—Sheet 2.
J. WALLACE.
CHEESE CUTTER.

No. 465,901. Patented Dec. 29, 1891.

Witnesses,
T. F. Mann
Frederick G. Goodrum

Inventor,
John Wallace
By Offield Towle & Linthicum
Att'ys.

UNITED STATES PATENT OFFICE.

JOHN WALLACE, OF LONE ROCK, WISCONSIN.

CHEESE-CUTTER.

SPECIFICATION forming part of Letters Patent No. 465,901, dated December 29, 1891.

Application filed March 6, 1891. Serial No. 363,973. (No model.)

*To all whom it may concern:*

Be it known that I, JOHN WALLACE, a citizen of the United States, residing at Lone Rock, in the county of Richland and State of Wisconsin, have invented certain new and useful Improvements in Cheese Safes and Cutters, of which the following is a specification.

My invention has for its object to provide certain improvements in cheese safes and cutters, as hereinafter described, and particularly pointed out in the claims.

I construct the case of cylindrical form, the side wall preferably composed of sheet metal and the heads of wood, the sheet-metal wall being divided vertically and the head divided transversely, the two sections being hinged together on a line back of the center of the case so as to permit the cutter to be manipulated. The cutter proper consists of the usual cheese-knife, and in order to cut measured quantities from the cheese I have provided a central slotted tube, which is fixed on the bottom of the case and projects through a rotatable cheese-board and through a central aperture of the cheese, and the slot of which serves as a guide for the point of the knife. At the front of the case and rising from the bottom wall thereof is a slotted standard forming a guide for the heel of the knife and through which slot the knife may be drawn backward in severing the cloth. Adjacent to the standard is fixed a scale-bar having marked thereon characters representing the divisions of weight. The knife has its point inserted through the slot in the end of the tube, and then by a drawing or shear cut the quantity of cheese is severed, the shear cut effecting the separation of the cloth, while the guides cause the knife to descend straight, thus insuring the cutting of the exact quantity desired. To protect the cut surfaces of the cheese I employ an angle-plate, which may be made from metal, bright tin being suitable, one of the flanges being pressed between the cheese and the turning-board and the upright member of the flange resting against the cut surface. In order to protect the fresh-cut surface from waste and deterioration, I provide a plate secured to and vertically depending from the hinged portion of the cover, said plate being mounted in a direct line with the slot of the central tube and with the slot of the guide. As the cutting is always done on this line the fresh-cut surface of the cheese is always in the plane of said slot, and therefore when the cutting has been performed and the case shut down this depending plate will pass down alongside the fresh-cut surface, fitting tightly thereto, and thus both of the cut surfaces of the cheese are at all times protected. In an uncut cheese it will be necessary to run the knife through it to make a way for the plate secured to the hinged portion of the case.

In the accompanying drawings I have shown my invention embodied in the preferred form, and the invention will be pointed out in the claims.

Figure 1 is a plan view with the hinged portion of the case thrown back and showing a section of the cheese removed. Fig. 2 is a side elevation looking from the view point indicated by the arrow 2 opposite Fig. 1. Fig. 3 shows a pusher or plunger for depressing the knife-point, and Fig. 4 is a detail of a protecting-plate.

A represents the bottom head of the case, and B the fixed portion of the wall thereof.

C represents the hinged portion affixed to the hinged member D of the head, and E represents the fixed member of the head. It will be observed that the fixed member E is of smaller section than the member D, so that when the hinged portion of the case is thrown up it is out of the way of the cutting.

F represents the rotatable board upon which the cheese rests, and this board has a central perforation or aperture $f$ for the passage of a hollow spindle or tube G, fixed to the lower head of the case, said case having a washer, flange, or bead $a$ surrounding the tube and forming a turn-table upon which the board F may freely turn. The table is a plain disk and can be used either side up. The spindle G is vertically slotted above the table. From the front edge of the lower head rises the guide H, which may take the form of a slotted plate or of two standards so disposed as to provide a slot or opening between their adjacent edges.

The cutting may be done with the usual cheese-knife. The point of the blade, being preferably square, will enter the slot of the tube G. The point of the knife is conveniently forced down by the pusher $g$, which in the form shown is cylindrical, with a T-head and a slot to embrace the knife-point and of a diameter to enter the hollow of the tube G. By forcing the knife downwardly through the cheese and drawing it back at the same time a measured quantity thereof is severed. I prefer to do the cutting by means of a knife which is free to be moved forward and back, so as to secure a drawing cut, as I find that this method insures the more ready severing of the cloth and renders the cutting both of the cheese and cloth easier. At the same time I prefer the features of guiding the knife in cutting by means of the expedients above described. A central core is removed from the cheese to provide for affixing it on the spindle. The removal of this core facilitates the cutting of the cheese without waste, the sections when cut having a blunt point which does not readily break.

I represents the scale-bar, preferably divided into eighths and secured adjacent to the slotted standard, the edge of the scale, or a movable marker therefor, being adapted to rest against the periphery of the cheese.

L represents a protecting-plate, which is angular in cross-section and of a length approximating the diameter of the cheese and of sufficient width to cover the cut edge thereof. The foot of the plate will be inserted beneath the cheese, while its upright portion rests in contact with the cut surface, against which it is firmly pressed and to which it will adhere sufficiently close to prevent the free access of the air and consequent drying or crumbling. This plate is adapted to be applied to either of the cut surfaces by reversing its ends so as to provide for cutting from either side of the cheese.

Secured to the under side of the hinged portion of the head is a vertically-positioned plate M, extending in line with the slot in the tube and with the slot in the guide, and adapted, when the hinged portion of the cover is shut down, to rest snugly against the fresh-cut surface of the cheese and thereby protect it also. When a fresh quantity of the cheese has been cut, the throwing up of the hinged cover of the base removes this plate out of the way and permits the turning board or table to be rotated to bring a fresh quantity under the knife.

It will be observed that by mounting the protecting-plate on the hinged portion of the lid it can be brought down close to the edge which it is to protect, thus separating from said edge any pieces which may have been detached by the previous cutting.

I claim—

1. In a cheese-cutter, the combination of a table rotatably mounted upon a centrally-fixed slotted tube, forming a guide for the inner end of the cheese-knife, of a guide for the heel of the knife secured with the case at its periphery, and a free knife adapted to have its point inserted in the slot of the central tube and to be withdrawn during the cutting-stroke through the outer guide, substantially as described.

2. A cheese-case comprising, in combination, a rotatable table upon which the cheese is mounted, a fixed slotted tube forming the axis for the rotating table, an outer guide secured with the case, a free knife adapted to have its point inserted in the slot of the tube, and a plunger or pusher adapted to engage the point of the knife and to pass into the hollow of the tube, whereby to force the point of the knife through the cheese, substantially as described.

3. In combination with a cheese-case having its side and top wall divided into two sections of unequal size, the larger of said sections being movably hinged to the other, a slotted knife-guide located at the center of the case and a guard at its periphery, and a protecting-plate secured with the hinged member in line with the slot of the central guide and with the outer guard and adapted to protect the fresh-cut surface of the cheese, substantially as described.

JOHN WALLACE.

Witnesses:
C. C. LINTHICUM,
FREDERICK C. GOODWIN.